(12) United States Patent
Chan et al.

(10) Patent No.: US 11,132,804 B2
(45) Date of Patent: Sep. 28, 2021

(54) HYBRID DEPTH ESTIMATION SYSTEM

(71) Applicant: Himax Technologies Limited, Tainan (TW)

(72) Inventors: Wei-Kai Chan, Tainan (TW); Yi-Nung Liu, Tainan (TW); Chin-Jung Tsai, Tainan (TW)

(73) Assignee: Himax Technologies Limited, Tainan (TW)

( * ) Notice: Subject to any disclaimer, the term of this patent is extended or adjusted under 35 U.S.C. 154(b) by 109 days.

(21) Appl. No.: 16/736,533

(22) Filed: Jan. 7, 2020

(65) Prior Publication Data
US 2021/0209778 A1    Jul. 8, 2021

(51) Int. Cl.
| | | |
|---|---|---|
| *G01B 11/25* | (2006.01) | |
| *G06T 7/521* | (2017.01) | |
| *G06T 7/13* | (2017.01) | |
| *G06T 5/00* | (2006.01) | |
| *G01B 11/22* | (2006.01) | |
| *G02B 5/02* | (2006.01) | |
| *G01S 17/89* | (2020.01) | |

(52) U.S. Cl.
CPC .............. *G06T 7/521* (2017.01); *G01B 11/22* (2013.01); *G01B 11/254* (2013.01); *G01S 17/89* (2013.01); *G02B 5/02* (2013.01); *G06T 5/002* (2013.01); *G06T 7/13* (2017.01); *G06T 2207/10028* (2013.01)

(58) Field of Classification Search
CPC ........... G06T 7/521; G06T 7/13; G06T 5/002; G06T 2207/10028; G01B 11/22; G01B 11/254; G01S 17/89; G02B 5/02

USPC .................................................. 356/601–624
See application file for complete search history.

(56) References Cited

U.S. PATENT DOCUMENTS

| | | | | |
|---|---|---|---|---|
| 2013/0100282 | A1* | 4/2013 | Siercks | G01B 11/2513 348/135 |
| 2014/0307057 | A1* | 10/2014 | Kang | G01B 11/2545 348/47 |
| 2015/0002734 | A1* | 1/2015 | Lee | G06K 9/22 348/367 |
| 2017/0132790 | A1* | 5/2017 | Jeong | G06T 15/205 |

(Continued)

FOREIGN PATENT DOCUMENTS

| | | |
|---|---|---|
| TW | 201837861 A | 10/2018 |
| TW | 201945824 A | 12/2019 |

OTHER PUBLICATIONS

Office Action dated Jan. 7, 2021 in corresponding Taiwan Patent Application No. 108148271.

*Primary Examiner* — Isiaka O Akanbi
(74) *Attorney, Agent, or Firm* — Donald E. Stout; Stout, Uxa & Buyan, LLP

(57) ABSTRACT

A hybrid depth estimation system includes a switchable projector that controllably projects either dot light or surface light onto an object; a sensor that receives reflected dot light or reflected surface light from the object to capture a first image or a second image respectively; a dot time-of-flight (ToF) depth generator that generates a dot depth map and an associated dot confidence map according to the first image; a surface ToF depth generator that generates a surface depth map according to the second image; and a denoise processor that processes the surface depth map according to a plurality of points on the dot depth map with high confidence, thereby generating a denoised depth map.

13 Claims, 2 Drawing Sheets

(56) References Cited

U.S. PATENT DOCUMENTS

2017/0374352 A1* 12/2017 Horesh ................ H04N 5/2226
2018/0020207 A1*  1/2018 Sugimura ............ G01B 11/245
2019/0304115 A1* 10/2019 Sladkov ............. G01B 11/2513

* cited by examiner

HYBRID DEPTH ESTIMATION SYSTEM

BACKGROUND OF THE INVENTION

1. Field of the Invention

The present invention generally relates to depth estimation, and more particularly to a hybrid depth estimation system with context-aware adaptive optimization.

2. Description of Related Art

A depth map is an image that contains information relating to distance of the surfaces of scene objects from a viewpoint, and is an important tool for machine vision that provides imaging-based automatic inspection and analysis for applications such as head-mounted devices, robot guidance, automatic inspection and process control.

Time-of-flight (ToF) depth sensors are widely used to obtain depth information by measuring elapsed time taken for projected light to reflect off a scene object and captured by the ToF depth sensor. Conventional ToF depth sensors with surface light projectors suffer energy dispersion and high power consumption.

Structured light is another technique adopted to obtain depth information based on geometric triangulation by projecting a known pattern (e.g., grids or horizontal bars) on to a scene object. Conventional structured light benefits from energy concentration and low power consumption but bulky in size due to required baseline.

A need has thus arisen to propose a novel depth estimation system to overcome drawbacks of conventional depth estimation systems.

SUMMARY OF THE INVENTION

In view of the foregoing, it is an object of the embodiment of the present invention to provide a hybrid depth estimation system with context-aware adaptive optimization adaptable to low power, high quality and long distance modes.

According to one embodiment, a hybrid depth estimation system includes a switchable projector, a sensor, a dot time-of-flight (ToF) depth generator, a surface ToF depth generator and a denoise processor. The switchable projector controllably projects either dot light or surface light onto an object. The sensor receives reflected dot light or reflected surface light from the object to capture a first image or a second image respectively. The dot ToF depth generator generates a dot depth map and an associated dot confidence map according to the first image. The surface ToF depth generator generates a surface depth map according to the second image. The denoise processor processes the surface depth map according to a plurality of points on the dot depth map with high confidence, thereby generating a denoised depth map.

According to another embodiment, a hybrid depth estimation system further includes a structured-light (SL) depth decoder, an edge detector and a fusion processor. The SL depth decoder generates an SL depth map according to the dot confidence map. The edge detector generates an edge map according to the denoised confidence map. The fusion processor processes the SL depth map, the dot depth map and the surface depth map according to the dot confidence map and the edge map, thereby generating an enhanced depth map.

DETAILED DESCRIPTION OF THE INVENTION

Figure 1:
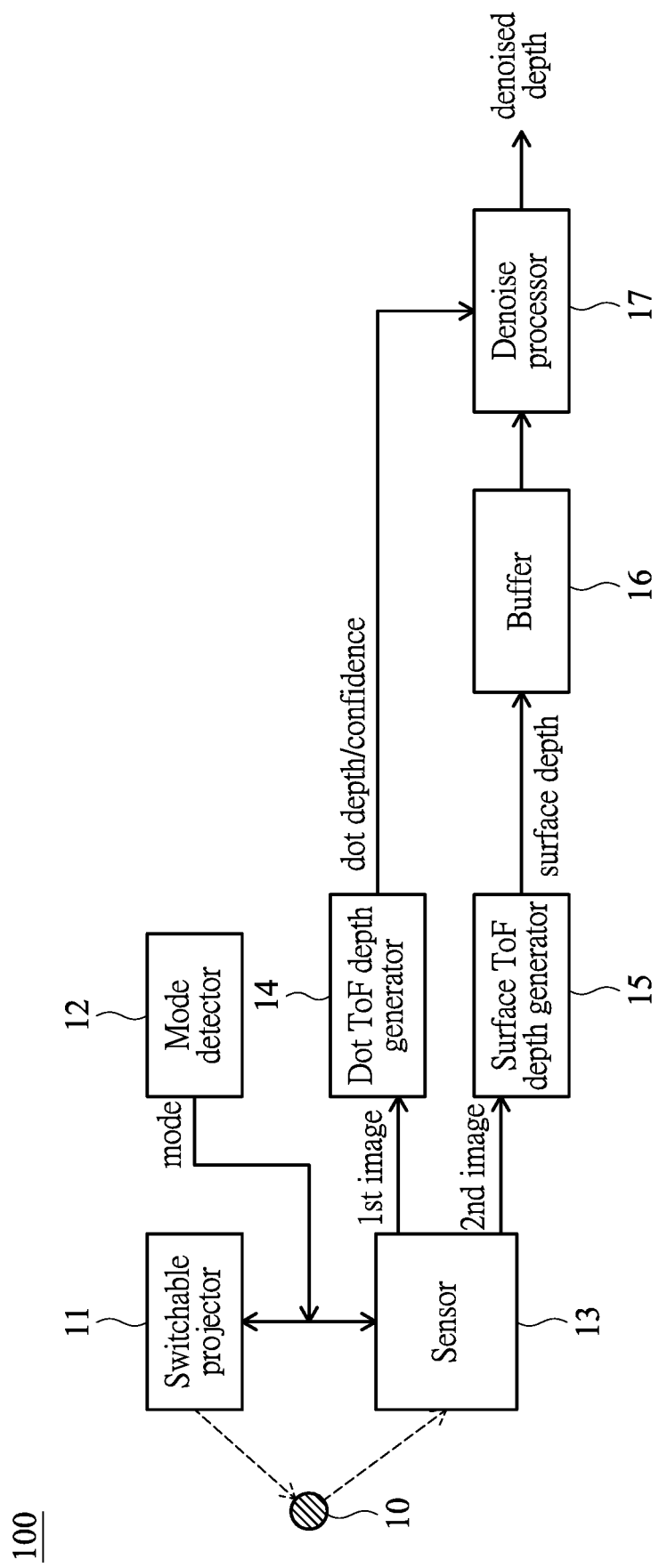
FIG. 1 shows a block diagram illustrating a hybrid depth estimation system according to a first embodiment of the present invention.

FIG. 1 shows a block diagram illustrating a hybrid depth estimation system 100 according to a first embodiment of the present invention. The blocks of the hybrid depth estimation system ("system" hereinafter) 100 may be implemented by electrical circuits, computer software or their combination. For example, at least a portion of the system 100 may be performed in a digital image processor with embedded memory. In another example, at least a portion of the system 100 may be implemented by an instruction-controlled computer.

In the embodiment, the system 100 may include a switchable projector 11, such as a dot-diffuser projector, that controllably projects either dot light or surface light onto an object 10. In other words, light projected by the switchable projector 11 may be switched between dot light and surface light. The switchable projector 11 may be controlled by a mode signal representing a mode determined by a mode detector 12. For example, the mode detector 12 may determine the mode according to power, quality and distance, which correspond to a low power mode, a high quality mode and a long distance mode, respectively. The mode detector 12 may alternatively determine the mode according to a current battery level, a current confidence (of time-of-flight measure) and a region-of-interest (ROI) of an eye tracker. Accordingly, the embodiment can realize context-aware adaptive optimization.

The system 100 of the embodiment may include a sensor 13 (disposed adjacent to the switchable projector 11) coupled to receive reflected dot light or reflected surface light from the object 10 to capture a first image when the dot light is projected or capture a second image when the surface light is projected. It is noted that the switchable projector 11 is used as a single (or only) light source, and the sensor 13 is used as a single (or only) capture device in the embodiment to capture all images.

According to one aspect of the embodiment, the system 100 may include a dot ToF depth generator 14 that generates a dot depth map according to the first image by measuring elapsed time taken for the projected dot light to reflect off the object 10 and captured by the sensor 13. The dot ToF depth generator 14 may also generate an associated dot confidence map. In the specification, as commonly adopted in the pertinent field, a confidence map represents confidence of a given distance (or depth) measure for every pixel in an image.

The system 100 may include a surface ToF depth generator 15 that generates a surface depth map according to the second image by measuring elapsed time taken for the projected surface light to reflect off the object 10 and captured by the sensor 13. The surface ToF depth generator 15 may also generate an associated surface confidence map. The system 100 may include a buffer 16 (e.g., memory device) configured to temporarily store the surface depth map.

The system 100 of the embodiment may include a denoise processor 17 configured to process the surface depth map (retrieved from the surface ToF depth generator 15 or the buffer 16) according to a plurality of points (or pixels) with high confidence on the dot depth map (from the dot ToF depth generator 14), thereby generating a denoised depth map. In this specification, the term "high" confidence may refer to a confidence greater than a predetermined value. The denoise processor 17 may also generate an associated denoised confidence map. In one embodiment, the denoise processor 17 may perform denosing operation by replacing depths on the surface depth map with corresponding depths on the dot depth map with high confidence.

Figure 2:
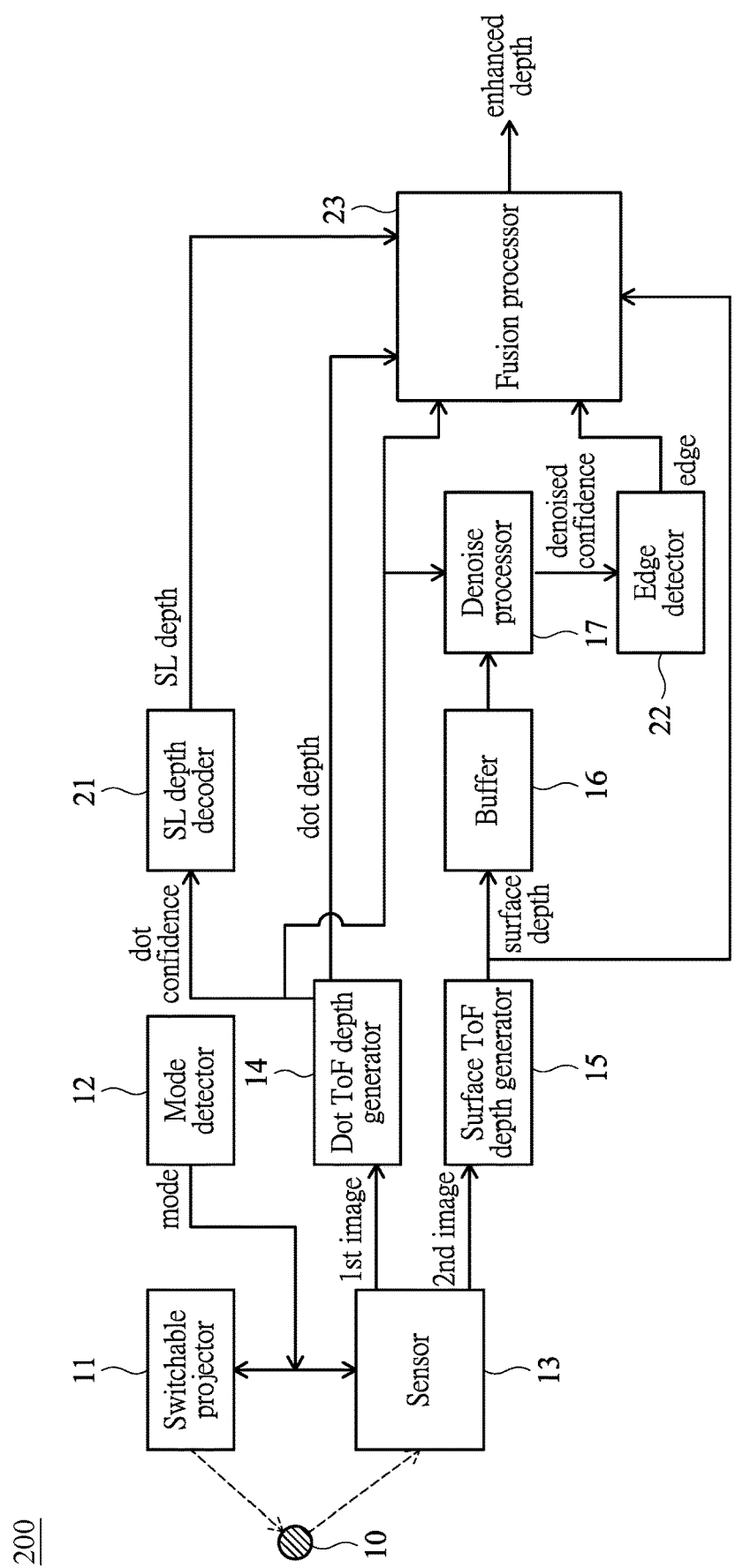
FIG. 2 shows a block diagram illustrating a hybrid depth estimation system according to a second embodiment of the present invention.

FIG. 2 shows a block diagram illustrating a hybrid depth estimation system 200 according to a second embodiment of the present invention. The hybrid depth estimation system ("system" hereinafter) 200 is similar to the system 100 of FIG. 1 but may further include the following blocks that will be described in the following paragraphs.

In the embodiment, the system 200 may include a structured-light (SL) depth decoder 21 configured to generate an SL depth map according to the dot confidence map (from the dot ToF depth generator 14). The SL depth decoder 21 may use the switchable projector 11 to project a known pattern, and use the sensor 13 to capture the reflected image, according to which the SL depth map may be generated based on geometric triangulation.

According to one aspect of the embodiment, the system 200 may include an edge detector 22 configured to generate an edge map according to the denoised confidence map (from the denoise processor 17).

The system 200 of the embodiment may include a fusion processor 23 coupled to receive and process the SL depth map (from the SL depth decoder 21), the dot depth map (from the dot ToF depth generator 14) and the surface depth map (from the surface ToF depth generator 15 or the buffer 16) according to the dot confidence map (from the dot ToF depth generator 14) and the edge map (from the edge detector 22), thereby generating an enhanced depth map.

Specifically, in one embodiment, the fusion processor 23 may perform fusion operation on depths (of the SL depth map, the dot depth map and/or the surface depth map) located on edges (detected by the edge detector 22) by correcting holes commonly occurring at the detected edges of the SL depth map.

In another embodiment, the fusion processor 23 may perform fusion operation according to distances of scene objects. For example, for near scene objects, the SL depth map has better result and thus has higher weighting while performing the fusion operation. To the contrary, for far scene objects, the surface depth map has better result and thus has higher weighting while performing the fusion operation.

According to the first and the second embodiments as set forth above, the system 100/200 has an improved detectable size compared to conventional SL systems, and the system 100/200 has enhanced effective working range, improved robustness to optical phenomenon and power reduction compared to conventional surface ToF systems. The system 200 further has better quality than conventional SL and ToF systems.

Although specific embodiments have been illustrated and described, it will be appreciated by those skilled in the art that various modifications may be made without departing from the scope of the present invention, which is intended to be limited solely by the appended claims.

What is claimed is:

1. A hybrid depth estimation system, comprising:
   a switchable projector that controllably projects either dot light or surface light onto an object;
   a sensor that receives reflected dot light or reflected surface light from the object to capture a first image or a second image respectively;
   a dot time-of-flight (ToF) depth generator that generates a dot depth map and an associated dot confidence map according to the first image;
   a surface ToF depth generator that generates a surface depth map according to the second image; and
   a denoise processor that processes the surface depth map according to a plurality of points on the dot depth map with high confidence, thereby generating a denoised depth map.

2. The system of claim 1, wherein the switchable projector comprises a dot-diffuser projector.

3. The system of claim 1, further comprising:
   a mode detector that generates a mode signal controlling the switchable projector.

4. The system of claim 1, wherein the switchable projector is a single light source, and the sensor is a single capture device.

5. The system of claim 1, further comprising:
   a buffer that temporarily stores the surface depth map.

6. A hybrid depth estimation system, comprising:
   a switchable projector that controllably projects either dot light or surface light onto an object;
   a sensor that receives reflected dot light or reflected surface light from the object to capture a first image or a second image respectively;
   a dot time-of-flight (ToF) depth generator that generates a dot depth map and an associated dot confidence map according to the first image;
   a surface ToF depth generator that generates a surface depth map according to the second image;
   a denoise processor that processes the surface depth map according to a plurality of points on the dot depth map with high confidence, thereby generating a denoised depth map and an associated denoised confidence map;
   a structured-light (SL) depth decoder that generates an SL depth map according to the dot confidence map;
   an edge detector that generates an edge map according to the denoised confidence map; and
   a fusion processor that processes the SL depth map, the dot depth map and the surface depth map according to the dot confidence map and the edge map, thereby generating an enhanced depth map.

7. The system of claim 6, wherein the fusion processor performs fusion operation on depths located on edges detected by the edge detector.

8. The system of claim 6, wherein the fusion processor performs fusion operation according to distance of the object.

9. The system of claim 8, wherein the SL depth map has higher weighting when the object is near the sensor, and the surface depth map has higher weighting when the object is far from the sensor.

10. The system of claim 6, wherein the switchable projector comprises a dot-diffuser projector.

11. The system of claim 6, further comprising:
    a mode detector that generates a mode signal controlling the switchable projector.

12. The system of claim 6, wherein the switchable projector is a single light source, and the sensor is a single capture device.

13. The system of claim 6, further comprising:
    a buffer that temporarily stores the surface depth map.

* * * * *